(12) United States Patent
Yamauchi

(10) Patent No.: US 7,787,451 B2
(45) Date of Patent: Aug. 31, 2010

(54) PACKET TRANSMISSION METHOD AND PACKET TRANSMISSION SYSTEM

(75) Inventor: Toshiro Yamauchi, Tokyo (JP)

(73) Assignee: NEC Corporation, Tokyo (JP)

( * ) Notice: Subject to any disclaimer, the term of this patent is extended or adjusted under 35 U.S.C. 154(b) by 419 days.

(21) Appl. No.: 11/822,945

(22) Filed: Jul. 11, 2007

(65) Prior Publication Data
US 2008/0013550 A1 Jan. 17, 2008

(30) Foreign Application Priority Data
Jul. 13, 2006 (JP) ............................. 2006-192885

(51) Int. Cl.
*H04L 12/28* (2006.01)
(52) U.S. Cl. ....................... 370/389; 370/394
(58) Field of Classification Search ................. None
See application file for complete search history.

(56) References Cited
U.S. PATENT DOCUMENTS
5,151,899 A * 9/1992 Thomas et al. ............... 370/394

6,788,686 B1 9/2004 Khotimsky et al.
6,853,641 B2 * 2/2005 Lindhorst-Ko et al. ...... 370/394
2002/0055999 A1 * 5/2002 Takeda ........................ 709/224
2002/0159431 A1 * 10/2002 Moulsley et al. ............ 370/347

FOREIGN PATENT DOCUMENTS
JP 01-231542 9/1989
JP 2000-115244 4/2000
JP 2004-201032 7/2004

* cited by examiner

*Primary Examiner*—Robert W Wilson
(74) *Attorney, Agent, or Firm*—Foley & Lardner LLP

(57) ABSTRACT

If a stored sequence number stored in a sequence number storage unit of a receiver coincides with a sequence number of a first arrival packet among a plurality of packets each having a smallest sequence number out of a plurality of packets stored in a packet reception buffer, then the receiver outputs the first arrival packet and increments the stored sequence number, and abandons the packets having smaller sequence numbers than the stored sequence number stored in the sequence number storage unit out of the plurality of packets stored in the packet reception buffer.

11 Claims, 4 Drawing Sheets

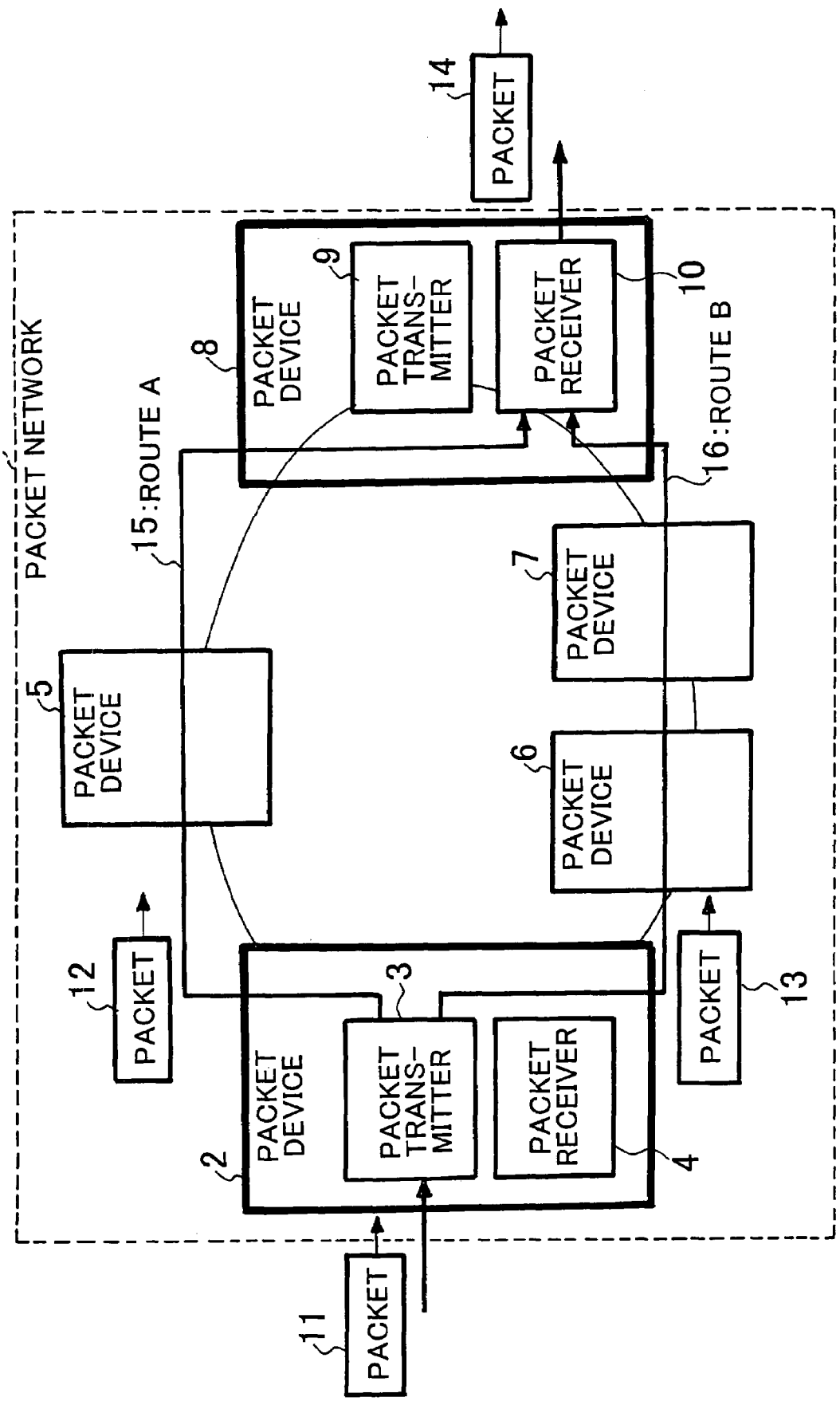

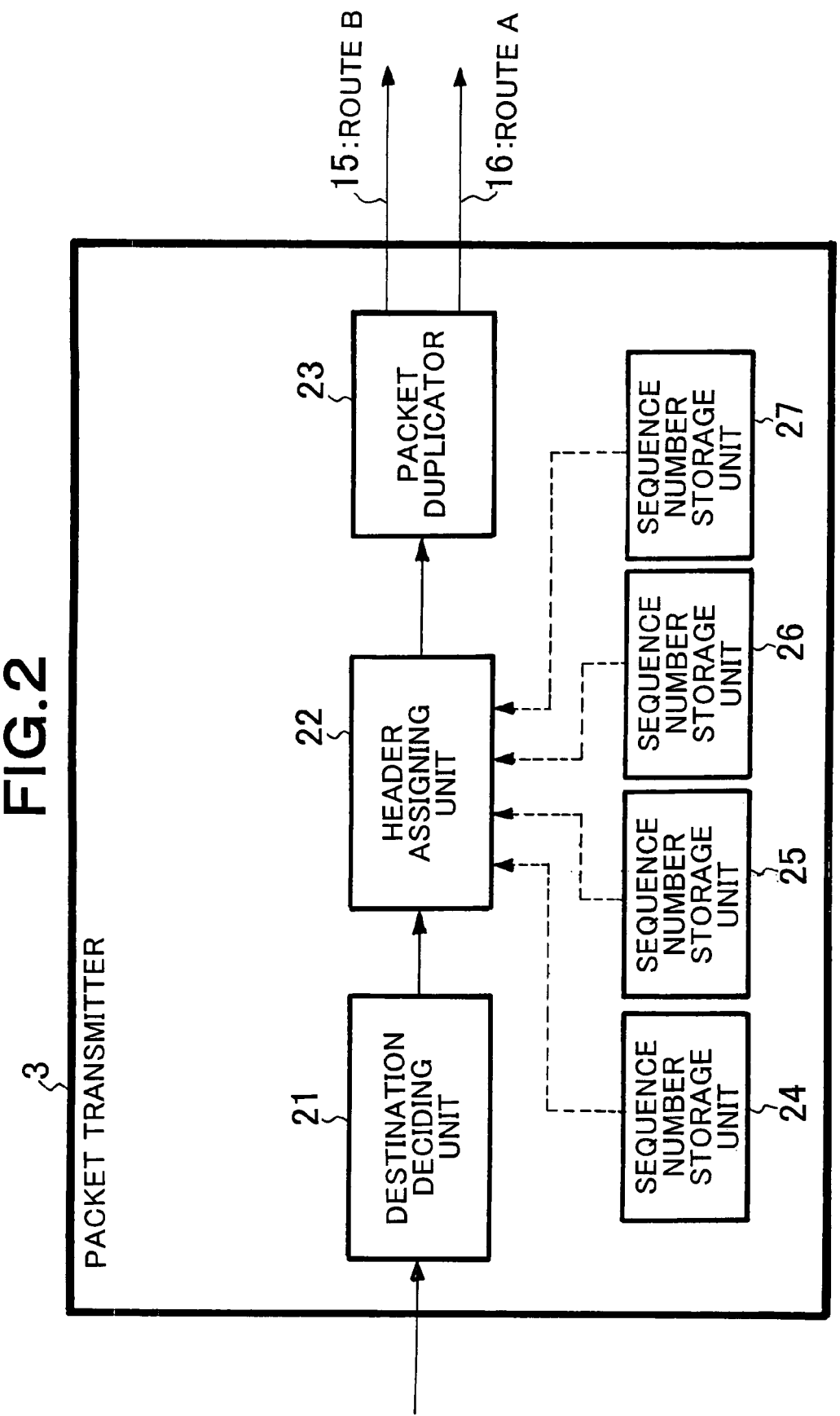

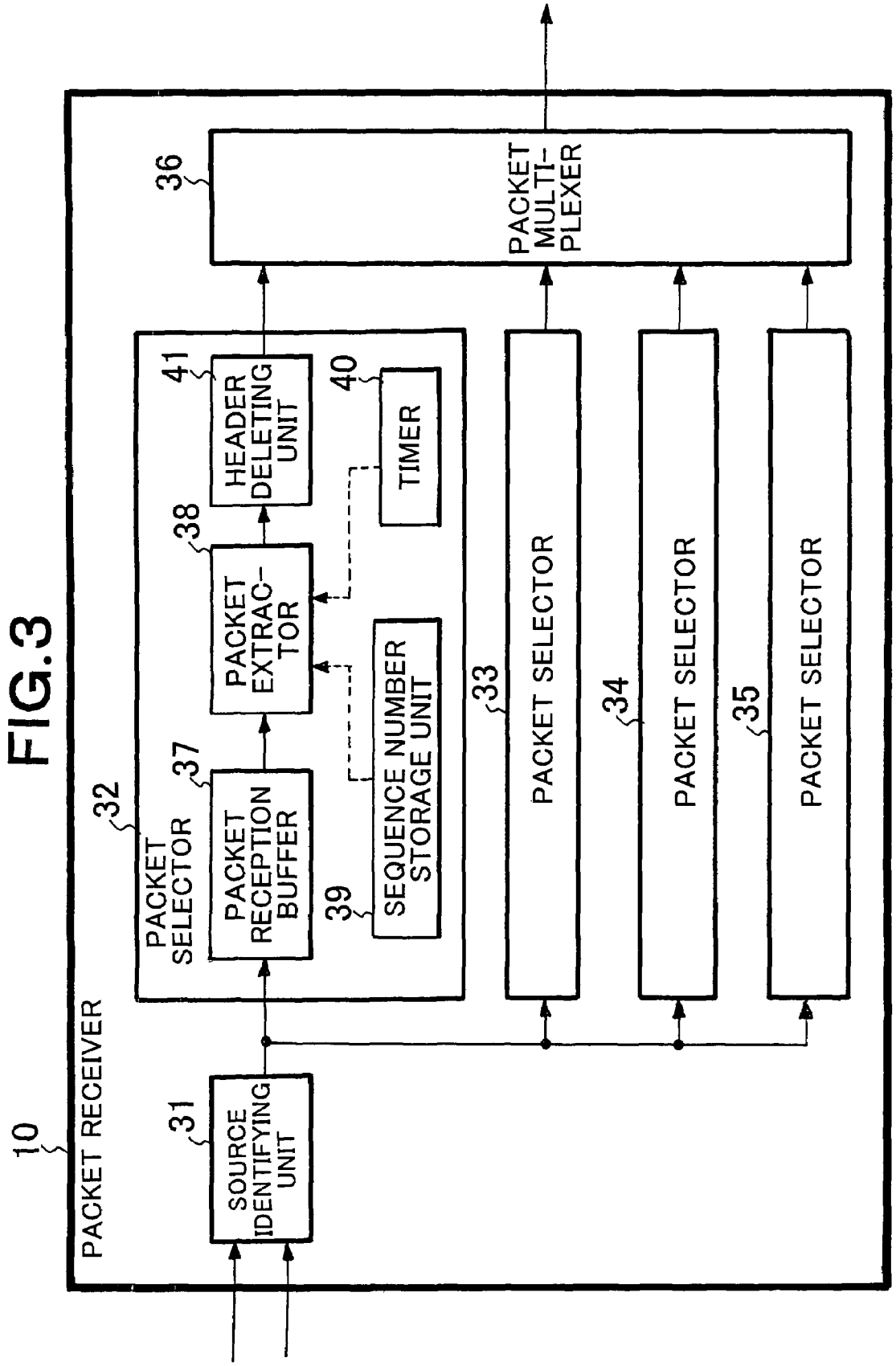

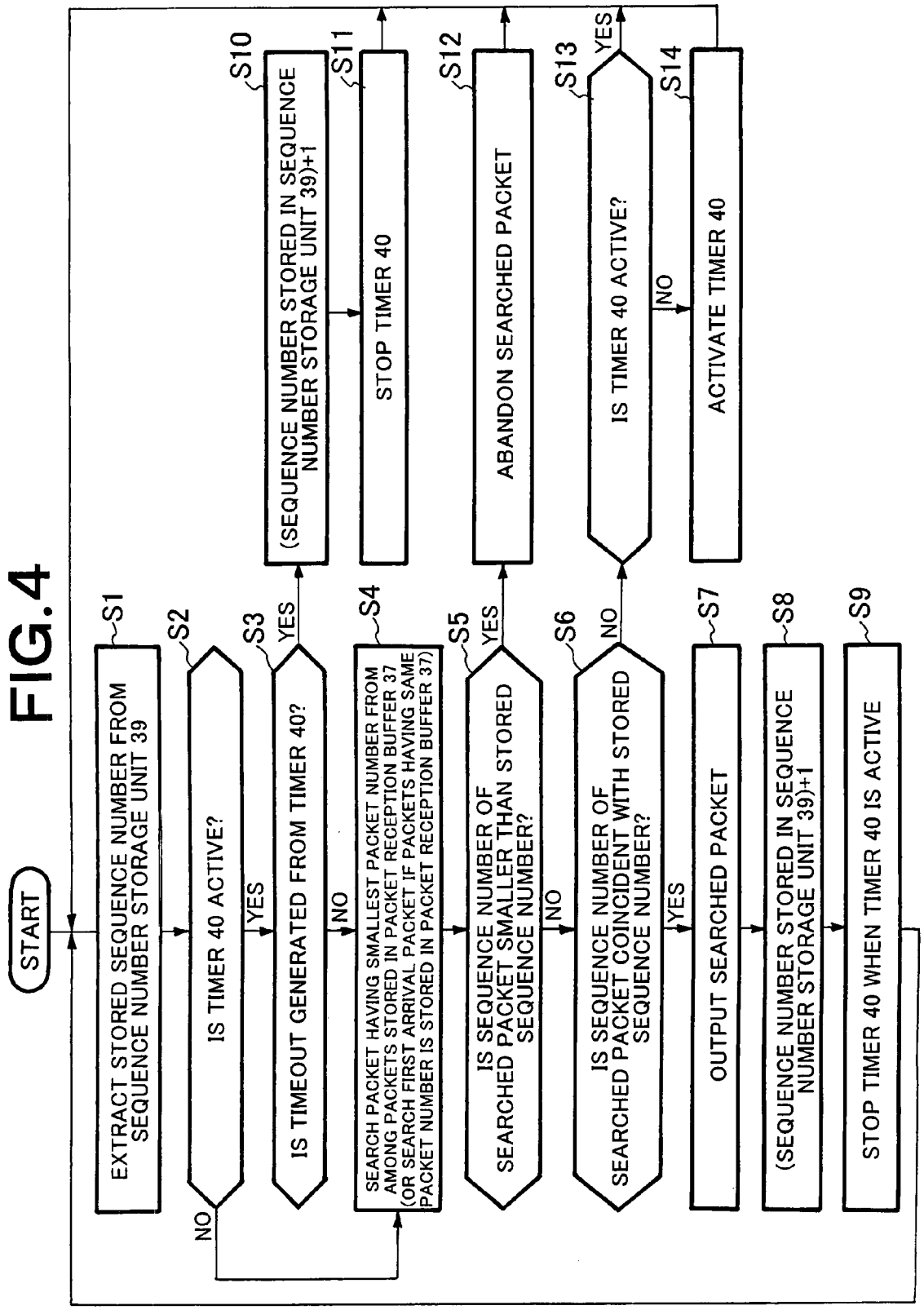

PACKET TRANSMISSION METHOD AND PACKET TRANSMISSION SYSTEM

This application is based upon and claims the benefit of priority from Japanese Patent Application No. 2006-192885, filed on Jul. 13, 2006, the disclosure of which is incorporated herein in its entirety by reference.

BACKGROUND OF THE INVENTION

1. Field of the Invention

The present invention relates to a packet transmission method and a packet transmission system for transmitting a packet via a network.

2. Description of the Related Art

In recent years, demand for establishing a highly reliable network for transmitting packets via Ethernet or the like with high reliability has risen. In addition, demand for a network capable of continuing communication without packet loss when a communication failure occurs to a packet network has risen. Generally, as a method of preventing instantaneous interruption during occurrence of a failure, there is proposed a method of switching an active device to a backup device without instantaneous interruption. However, to execute such a method, it is necessary to incorporate various functions such as a function of always matching a phase of traffic of the active device to that of the backup device and a function of a mechanism for detecting a failure and a congestion of the active device in a system.

The invention related to the present invention is disclosed in Japanese Patent Application Laid-Open No. 01-231542.

To continue traffic transmission without interruption when a failure occurs, a method of carrying traffic from a transmitting side to two paths, i.e., a path to the active device and a path to the backup device, and of causing a receiving side to select one of traffics from the active and backup devices and to output the selected traffic is adopted. With this method, one of the active and backup devices that has a smaller delay is matched to the other device that has a greater delay. Namely, the traffic from the device having the smaller delay is kept waiting for arrival of the traffic from the device having the greater delay so as to enable the same traffic to be output from the active and backup devices at the same timing (match traffic phases to each other). Furthermore, the traffic from the active device is always selected and output. If a failure occurs to the active device, then the receiving side detects occurrence of the failure to the active device by some means, switch selection from the active device to the backup device, and causes the backup device to output the traffic. The conventional technique has, however, the following disadvantages.

To prevent occurrence of interruption of traffic when the active device is switched to the backup device, it is disadvantageously necessary to control matching packet arrival timing between the active device and the backup device. To perform the control, a buffer that absorbs a transmission delay of the active device and that of the backup device is necessary. Furthermore, the greater delay is disadvantageously and always adopted as the transmission delay.

SUMMARY OF THE INVENTION

It is an object of the present invention to provide a packet transmission method and a packet transmission system capable of continuing communication without a packet loss even if a failure or congestion occurs, and dispensing with the conventional functions.

According to an aspect of the present invention, there is provided a packet transmission method comprising steps of: causing a transmitter to transmit a packet to a receiver via a plurality of transmission paths; and causing the receiver to select an actual first arrival packet from among same packets possibly received via the plurality of transmission paths, respectively by searching sequence numbers of actually received packets.

According to the present invention, communication can be continued without packet loss even if a failure or a congestion occurs.

BRIEF DESCRIPTION OF THE DRAWINGS

FIG. 1 is a block diagram showing a configuration of a packet transmission system according to an exemplary embodiment of the present invention;

FIG. 2 is a block diagram showing a configuration of a packet transmitter shown in FIG. 1;

FIG. 3 is a block diagram showing a configuration of a packet receiver shown in FIG. 1; and FIG. 4 is a flowchart showing an operation performed by a packet extractor shown in FIG. 3.

DESCRIPTION OF THE PREFERRED EMBODIMENTS

Exemplary embodiments of the present invention will be described hereinafter in detail with reference to the accompanying drawings.

The present invention can provide packet devices and a packet network as follows. A packet is duplicated for a plurality of paths, respectively, the duplicated packets are transmitted to a destination, and the packet that arrives at the destination first ("first arrival packet") is selected as a packet from an active device and output. Namely, a receiving side discriminates the active device from a backup device based on packets, i.e., determines a device transmitting the first arrival packet as the active device. By doing so, there is no necessary to perform phase matching among the packets transmitted via a plurality of paths, respectively. Further, there is no need to notify the receiving side of occurrence of a packet loss to one of the paths. Even if a packet loss occurs to one of the paths due to a failure or congestion, the packet arriving at the receiving side via a normal path is output, thereby making it possible to prevent the packet loss.

The exemplary embodiment of the present invention is characterized in that a packet device duplicates a packet, and transmits duplicated packets to a destination packet device via a plurality of transmission paths, respectively. It is also characterized in that the destination packet device selects and outputs one of the duplicated packets. By so configuring, even if a failure or the like occurs to one of the transmission paths, communication with the destination packet device can be continued without a packet loss and without changing a packet transmission sequence.

In FIG. 1, a packet transmitter 3 in a packet device 2 assigns a sequence number to a packet 11 input to the packet device 2, duplicates the packet 11, and transmits duplicated packets to a packet device 8 that is a destination packet device so as to transmit the packets via different paths as packets 12 and 13, respectively. In the packet device 8, a packet receiver 10 receives the packets 12 and 13, selects only one of the packets 12 and 13 that is the first arrival packet, and outputs the selected packet as a packet 14. At this time, the packet receiver 10 in the packet device 8 identifies that the packets 12 and 13 are the same packet based on the sequence number assigned to the packet 11, and identifies a transmission sequence relative to the other packets.

In this manner, the packet 11 is duplicated, and the duplicated packets 12 and 13 are transmitted to the packet device 8 via the different paths, respectively. The packet device 8, which is the destination packet device, selects the first arrival packet, and outputs the selected packet according to the sequence number. Therefore, even if a packet loss occurs to one of the transmission paths via which the packets 12 and 13 are transmitted due to a failure, a congestion or the like, the other packet arrives at the destination packet device 8 via the other transmission path. It is thereby possible to continue communication with the destination packet device 8 without a packet loss and without a change in packet transmission sequence.

Referring again to FIG. 1, a packet network 1 is configured to include packet devices 2, 5, 6, 7, and 8. A packet input to the packet network 1 is transferred to a destination packet device, and output to the outside of the packet network 1.

In FIG. 1, the packet device 2, 5, 6, 7, and 8 are connected to one another into a ring, and each of the packet devices 2, 5, 6, 7, and 8 has two paths, i.e., a path a 15 and a path b 16, as paths to the other packet device.

Namely, each of the packet devices 2, 5, 6, 7, and 8 includes a packet transmitter and a packet receiver. Each of the packet devices 2, 5, 6, 7, and 8 serves as both a transmitting side and a receiving side. FIG. 1 shows only the packets 12 and 13 transmitted from the packet device 2 to the packet device 8. However, the other packets are actually present. The other packets include, for example, packets transmitted from the packet device 2 to the packet device 5, packets transmitted from the packet device 2 to the packet device 6, and packets transmitted from the packet device 2 to the packet device 7. They also include, for example, packets transmitted from the packet device 5 to the packet device 2, packets transmitted from the packet device 5 to the packet device 6, packets transmitted from the packet device 5 to the packet device 7, and packets transmitted from the packet device 5 to the packet device 8. Further, each of the packet devices 6, 7, and 8 transmits packets to the other four packet devices. For all of the transmissions, each packet is duplicated and duplicated packets are transmitted to a destination packet device via different transmission paths, respectively.

In FIG. 1, the packet device 2 is configured to include the packet transmitter 3 and a packet receiver 4. The packet transmitter 3 duplicates the packet 11 input to the packet device 2, transmits one of the duplicated packets to the destination packet device 8 via the path a 15 passing through the packet device 5 as the packet 12, and transmits the other packet to the destination packet device 8 via the path b 16 passing through the packet devices 6 and 7 as the packet 13.

In FIG. 1, the packet device 8 is configured to include the packet transmitter 9 and the packet receiver 10. The packet receiver 10 receives the packets 12 and 13 transmitted from the packet device 2, and outputs the first arrival packet as the packet 14.

In FIG. 1, each of the packet devices 5, 6, and 7 is configured to include a packet transmitter and a packet receiver similarly to the packet devices 2 and 8.

FIG. 2 shows a detailed configuration of the packet transmitter 3 shown in FIG. 2.

Referring to FIG. 2, the packet transmitter 3 is configured to include a destination deciding unit 21, a header assigning unit 22, a packet duplicator 23, and sequence number storage unit 24, 25, 26, and 27 corresponding to destination packet devices in the packet network 1 other than the packet device 2 including the packet transmitter 3, respectively.

In FIG. 2, the destination deciding unit 21 decides a packet device that is a destination of an input packet based on information stored in the packet.

In FIG. 2, the header assigning unit 22 assigns information on the destination packet device decided by the destination deciding unit 21, information on the packet device 2 that is a source packet device and that includes the packet transmitter 3, and a sequence number stored in the sequence number storage unit 26 to the input packet.

In FIG. 2, the sequence number storage units 24, 25, 26, and 27 store therein sequence numbers for the destination packet devices 5, 6, 7, and 8, respectively. Each of the sequence numbers stored therein is set to an initial value of 1, and incremented by 1 whenever the header assigning unit 22 assigns a header to the packet to be transmitted to the corresponding destination packet device. The sequence number returns to 1 when exceeding a maximum value. Each of the sequence numbers stored in the sequence number storage units 24, 25, 26, and 27 is used when the header assigning unit 22 assigns a header to the corresponding packet.

In FIG. 2, each of the sequence numbers stored in the respective sequence number storage units 24, 25, 26, and 27 and the sequence number assigned to the packet 11 by the header assigning unit 22 returns to 1 when exceeding the maximum provided for according to a bit width. Due to this, the bit width is set be sufficiently large to prevent different packets with the same sequence number from being present in a packet reception buffer of a packet receiver in the receiving-side packet device, that is, to prevent different packets from being erroneously identified as the same packet due to a delay difference between the paths a 15 and b 16.

In FIG. 2, the packet duplicator 23 duplicates the input packet and transmits the duplicated packets to the path a 15 and the path b 16, respectively.

FIG. 3 shows a detailed configuration of the packet receiver 10 shown in FIG. 1.

Referring to FIG. 3, the packet receiver 10 is configured to include a source identifying unit 31, a packet multiplexer 36, and packet selectors 32, 33, 34, and 35 corresponding to source packet devices other than the packet device 2 including the packet receiver 10 in the packet network 1.

In FIG. 3, the source identifying unit 31 judges source packet devices by referring to header information on received packets, and sorts the packets to the packet selectors 32, 33, 34, and 35 corresponding to the judged source packet devices, respectively.

In FIG. 3, the packet selector 32 is a packet selector corresponding to the packet transmitted from the packet device 2, and is configured to include a packet reception buffer 37, a packet extractor 38, a sequence number storage unit 39, a timer 40, and a packet deleting unit 41.

In FIG. 3, the packet selectors 33, 34, and 35 are packet selectors corresponding to the packets transmitted from the packet device 5, 6, and 7, respectively. Similarly to the packet selector 32, each of the packet selectors 33, 34, and 35 is configured to include the packet reception buffer 37, the packet extractor 38, the sequence number storage unit 39, the timer 40, and the packet deleting unit 41.

In FIG. 3, the packet reception buffer 37 stores therein received packets.

In FIG. 3, the packet extractor 39 extracts a packet having a sequence number coincident with a sequence number stored in the sequence number storage unit 39 among those stored in the packet reception buffer 37, and transmits the extracted packet to the packet deleting unit 41. Further, the packet extractor 38 abandons packets having smaller sequence numbers than the sequence number stored in the sequence number storage unit 39 among those stored in the packet reception buffer 37.

In FIG. 3, the timer 40 is stopped in an initial state and activated by the packet extractor 38. After being activated, the timer 40 notifies the packet extractor 38 whether a timeout is generated.

In FIG. 3, the sequence number storage unit 39 stores therein the sequence number. The sequence number is set to an initial value of 1 and incremented by 1 whenever the packet extractor 39 transmits a packet to the header deleting unit 41. The sequence number returns to 1 when exceeding a maximum value.

In FIG. 3, the header deleting unit 41 deletes the header assigned to a packet by the packet transmitter of the source packet device, and transmits the header-deleted packet to a packet multiplexer 36.

In FIG. 3, the packet multiplexer 36 multiplexes the packets transmitted from the packet selectors 32, 33, 34, and 35, and outputs a multiplexed packet.

In the exemplary embodiment stated above, it is not always necessary to connect the packet devices 3, 5, 6, 7, and 8 into the ring in the packet network 1. It suffices to connect the packet devices 2, 5, 6, 7, and 8 so that a plurality of paths is present from each source packet device to a destination packet device.

Referring to FIGS. 1, 2, and 3, an operation flow related to the packet 11 input to the packet device 2 will be described.

The packet 11 input to the packet device 2 is transmitted to the packet transmitter 3, processed by the packet transmitter as follows, and transmitted to the destination packet device 8.

In the packet transmitter 3, the destination packet device that is the destination of the packet 11 transmitted to the packet transmitter 3 is searched based on the information stored in the destination deciding unit 21, the packet device 8 is decided as the destination packet device, and the packet 11 for which the destination packet device 8 is decided is transmitted to the header assigning unit 22.

The header assigning unit 22 assigns the information on the destination packet device 8 decided by the destination deciding unit 21, the information on the packet device 2 that is the source packet device, and the sequence number stored in the sequence number storage unit 27 corresponding to the destination packet device 8, as a header, to the packet 11 transmitted to the header assigning unit 22. The header assigning unit 22 transmits the header-assigned packet 11 to the packet duplicator 23. At the time of assigning the header to the packet 11, the sequence number stored in the sequence number storage unit 27 is incremented by 1 for a next arrival packet.

The packet duplicator 23 duplicates the packet 11 transmitted to the packet duplicator 23 and outputs the duplicated packets 12 and 13 to the path a 15 and the path b 16, respectively.

The packet 12 is transferred to the packet device 8 via the packet device 5 based on the destination information included in the header of the packet 12 in the packet network 1. The packet 13 is transferred to the packet device 8 via the packet devices 6 and 7 based on the destination information included in the header of the packet 13 in the packet network 1. As a result, the packets 12 and 13 arrive at the packet device 8 if no failure or congestion occurs to the paths a 15 and b 16 on their way.

The packets 12 and 13 that arrive at the packet device 8 are transmitted to the packet receiver 10. In the packet receiver 10, the source identifying unit 31 selects one of the packet selectors 32 to 35 based on the information on the source packet device stored in the header of each of the packets 12 and 13. As a result, the packets 12 and 13 are transmitted to the packet selector 32 corresponding to the packet device 2 and also stored in the packet reception buffer 37.

The packet extractor 38 transmits one of the packets 12 and 13 stored in the packet reception buffer 37, i.e., the first arrival packet to the header deleting unit 41. The header deleting unit 41 deletes the header from the packet 12 or 13 transmitted to the packet deleting unit 41. The header deleting unit 41 transmits the header-deleted packet 12 or 13 to the packet multiplexer 36. The packet multiplexer 36 multiplexes the packet 12 or 13 with packets from the other packet selectors, i.e., the packet selectors 33, 34, and 35, and outputs the multiplexed packet to the outside. The packet extractor 38 abandons the packet 12 or 13 that is not transmitted to the header deleting unit 41.

An operation performed by the packet extractor 38 will now be described with reference to the flowchart of FIG. 4.

The packet extractor 38 extracts the sequence number stored in the sequence number storage unit 39 (S1). The extracted sequence number is referred to as "stored sequence number". The packet extractor 38 activates the timer 40 and determines whether a time out is generated from the timer 40 (S2 and S3). If the timeout is generated, this means that the packet having the stored sequence number did not arrive at the packet device 8 from any of the paths a 15 and b 16 within specified time. Therefore, the packet extractor 38 increments the sequence number stored in the sequence number storage unit 39 by 1 (S10), stops the timer 40 (S11), and returns to a processing for extracting the sequence number stored in the sequence number storage unit 39 (S1).

If the timeout is not generated, then the packet extractor 38 searches one of the packets stored in the packet reception buffer 37 (S4), and compares a sequence number of the searched packet with the stored sequence number (S5 and S6). At this moment, one or more packets are stored in the packet reception buffer 37. The search target packet is a packet having a smallest sequence number among those stored in the packet reception buffer 37. Although packets having the same sequence number may possibly arrive at the destination packet device, the packets having the same sequence number normally arrive at the destination packet device at staggered time intervals. If a plurality of packets having the same smallest sequence number is present in the packet reception buffer 37, the packet arriving at earliest time is the search target packet.

If the sequence number of the searched packet is smaller than the stored sequence number as a result of the comparison, this means that the packet having the same sequence number and arriving at the destination packet device from the other path is already output. Therefore, the packet extractor 38 abandons the searched packet (S12), and returns again to the processing for extracting the sequence number stored in the sequence number storage unit 39 (S1).

If the sequence number of the searched packet is coincident with the stored sequence number as a result of the comparison, the packet extractor 38 outputs the searched packet to the header deleting unit 41 (S7), increments the sequence number stored in the sequence number storage unit 39 by 1 (S8), stops the timer 40 when the timer 40 is active (S9), and returns again to the processing for extracting the sequence number stored in the sequence number storage unit 39 (S1).

If the sequence number of the searched packet is not smaller than or not coincident with the stored sequence number, i.e., larger than the stored sequence number as a result of the comparison, this means that a packet to be output next does not arrive yet. Therefore, while the searched packet remains stored in the packet reception buffer 37, the packet extractor 38 determines whether the timer 40 is already active (S13) to wait for the packet to be output next. If the timer 40 is not active, the packet extractor 38 activates the timer 40 (S14). If the timer 40 is active, the packet extractor 38 returns again to the processing for extracting the sequence number stored in the sequence number storage unit 39 (S1) without any processing on the timer 40.

In this manner, the packet extractor 38 outputs only the first arrival packet among a plurality of arrival packets, and abandons the packets other than the first arrival packet. It is thereby possible to continue communication without a packet loss as long as the packet arrives at the destination packet device via any one of the routes.

According to the present invention, the packet transmitter 3 includes the sequence number storage units 24, 25, 26, and 27 corresponding to the respective destination packet devices. The packet receiver 10 includes the packet selectors 32, 33, 34, and 35 corresponding to the respective source packet devices. If the packet transmits 3 includes only one sequence number storage unit without including a plurality of sequence number storage units corresponding to the respective destination packet devices, then sequence numbers are assigned to all the packets output from the packet transmitter 3 in sequence, irrespectively of their destinations, and the packets are transferred to the respective destination packet devices. In this case, each of the destination packet device receives packets having irregular sequence numbers. For example, a packet having a sequence number 1 is transferred to the packet device 8, a packet having a sequence number 2 is transferred to the packet device 5, and a packet having a sequence number 3 is transferred to the packet device 8. As a result, the packet receiver 10 cannot determine a packet having which sequence number is to be received next, and perform a reception processing. Furthermore, if the packet receiver 10 includes only one packet selector without including a plurality of packet selectors corresponding to the respective source packet devices, the packet receiver 10 receives packets transmitted from different source packet devices but having the same sequence number. This is because the respective source packet devices assign sequence numbers to their packets independently of one another and transmit the packets to the destination packet device. If the sequence numbers are not discriminated for every source packet device, then the different packets are abandoned for the reason that the packets have the same sequence number, and the packet receiver 10 cannot perform the correct reception processing. That is why the packet transmitter 3 includes the sequence number storage units 24, 25, 26, and 27 corresponding to the respective destination packet devices, and the packet receiver 10 includes the packet selectors 32, 33, 34, and 35 corresponding to the respective source packet devices according to the present invention.

According to the present invention, the packet receiver 10 includes the timer 40 as shown in FIG. 3. As shown in the flowchart of FIG. 4, if the packet having the sequence number for which the packet receiver 10 expects to receive the packet does not arrive, the timer 40 is activated. After passage of time corresponding to the timeout, the packet receiver 10 gives up reception of the packet having the sequence number for which the packet receiver 10 expects to receive the packet, and changes operation to reception of a packet having a next sequence number. By doing so, even if an accident occurs that failures occur to all the paths from the packet transmitter 3 to the packet receiver 10 (i.e., failures occur to the paths a 15 and b 16) and a packet loss occurs to the packet receiver 10, then the packet receiver 10 gives up the lost packet but can continue receiving subsequent packets. If the above-stated function is not provided, the receiving side permanently waits for arrival of the lost packet and cannot receive subsequent packets.

The other conventional disadvantage is as follows. Since the receiving side switches the active device to the backup device when a failure occurs, it is necessary for the receiving side to always monitor and detect whether a failure occurs to the active device by some means.

Yet another conventional disadvantage is as follows. If a packet loss occurs to the active device due to congestion, the active device cannot be switched to the backup device because no failure occurs to the active device. As a result, a packet loss occurs.

With the packet transmission method described above, a plurality of packet devices each including the transmitter and the receiver may be mutually connected in a network, and the transmitter of one of the packet devices that is a source packet device, from which the packet is transmitted, may assign a sequence number stored in a sequence number storage unit prepared to correspond to one of the packet devices that is a destination packet device, to which the packet is transmitted, to the packet according to the destination packet device.

With the packet transmission method described above, a plurality of packet devices each including the transmitter and the receiver may be mutually connected in a network, and the receiver of one of the packet devices that is a destination packet device, to which the packet is transmitted, may sort the actually received packets to a plurality of packet selectors, respectively, based on packet device identification information included in the actually received packets, each of the packet selectors selecting the actual first arrival packet.

With the packet transmission method described above, if a stored sequence number stored in a sequence number storage unit of the receiver coincides with the sequence number of the actual first arrival packet among a plurality of packets each having a smallest sequence number out of a plurality of packets stored in a packet reception buffer, then the receiver may output the actual first arrival packet and increment the stored sequence number, and may abandon the packets having smaller sequence numbers than the stored sequence number stored in the sequence number storage unit out of the plurality of packets stored in the packet reception buffer.

With the packet transmission method described above, if the sequence number of the actual first arrival packet among the plurality of packets each having the smallest sequence number out of the plurality of packets stored in the packet reception buffer is greater than the stored sequence number stored in the sequence number storage unit of the receiver, the receiver may leave the actual first arrival packet in the packet reception buffer.

With the packet transmission method described above, if the sequence number of the actual first arrival packet among the plurality of packets each having the smallest sequence number out of the plurality of packets stored in the packet reception buffer is smaller than the stored sequence number stored in the sequence number storage unit of the receiver and a timer of the receiver is not activated, the receiver may activate the timer, if the actual first arrival packet is output and the timer is activated, the receiver may stop the timer, if a timeout is generated from the timer, the receiver increments the stored sequence number and stops the timer, and if the timer is not activated or if the timer is activated but the timeout is not generated from the timer, the receiver may perform a processing for comparing the stored sequence number stored in the sequence number storage unit of the receiver with the sequence number of the actual first arrival packet among the plurality of packets each having the smallest packet number out of the plurality of packets stored in the packet reception buffer.

As stated so far, the present invention exhibits first and second advantages.

The first advantage is as follows. A packet is duplicated, and duplicated packets are transferred to a destination packet device via a plurality of paths, respectively. Due to this, even if a failure or congestion occurs to one of the paths, then the packet arrives at the destination packet device and the arrival packet is output as long as the other path is normal. It is, therefore, possible to continue communication without a packet loss resulting from the failure or congestion of the path.

The second advantage is as follows. The transmitting side assigns sequence numbers to the duplicated packets, respectively, and transmits the duplicated packets to the receiving side. The receiving side outputs only the first arrival packet irrespectively of the path via which the packet is transmitted but according to the transmission sequence, and abandons the other packets. Therefore, there is no need to always match phases of packets arriving via a plurality of paths, and to detect whether a failure or congestion occurs to any one of the paths so that the receiving side determines which packet via which path is to be output. Therefore, differently from the conventional techniques, a packet device that can dispense with the function of packet phase matching and functions of monitoring and detecting the failure and congestion can be used.

Although the exemplary embodiments of the present invention have been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

What is claimed is:

1. A packet transmission method comprising steps of:
   causing a transmitter to transmit a packet to a receiver via a plurality of transmission paths; and
   causing the receiver to select an actual first arrival packet from among packets received via the plurality of transmission paths, respectively by searching sequence numbers of actually received packets,
   wherein a plurality of packet devices each including the transmitter and the receiver is mutually connected in a network, and
   wherein the transmitter of one of the packet devices, that is a source packet device from which the packet is transmitted, assigns a sequence number stored in a sequence number storage unit to the packet, wherein the sequence number corresponds to one of the packet devices that is a destination packet device to which the packet is transmitted.

2. The packet transmission method according to claim 1, wherein the receiver of one of the packet devices that is a destination packet device, to which the packet is transmitted, sorts the actually received packets to a plurality of packet selectors, respectively, based on packet device identification information included in the actually received packets, each of the packet selectors selecting the actual first arrival packet.

3. The packet transmission method according to claim 1, wherein if a stored sequence number stored in a sequence number storage unit of the receiver coincides with the sequence number of the actual first arrival packet among a plurality of packets each having a smallest sequence number out of a plurality of packets stored in a packet reception buffer, then the receiver outputs the actual first arrival packet and increments the stored sequence number, and abandons the packets having smaller sequence numbers than the stored sequence number stored in the sequence number storage unit out of the plurality of packets stored in the packet reception buffer.

4. The packet transmission method according to claim 3, wherein if the sequence number of the actual first arrival packet among the plurality of packets each having the smallest sequence number out of the plurality of packets stored in the packet reception buffer is greater than the stored sequence number stored in the sequence number storage unit of the receiver, the receiver leaves the actual first arrival packet in the packet reception buffer.

5. A packet transmission method comprising steps of:
   causing a transmitter to transmit a packet to a receiver via a plurality of transmission paths; and
   causing the receiver to select an actual first arrival packet from among packets received via the plurality of transmission paths, respectively by searching sequence numbers of actually received packets,
   wherein if a stored sequence number stored in a sequence number storage unit of the receiver coincides with the sequence number of the actual first arrival packet among a plurality of packets each having a smallest sequence number out of a plurality of packets stored in a packet reception buffer, then the receiver outputs the actual first arrival packet and increments the stored sequence number, and abandons the packets having smaller sequence numbers than the stored sequence number stored in the sequence number storage unit out of the plurality of packets stored in the packet reception buffer,
   wherein if the sequence number of the actual first arrival packet among the plurality of packets each having the smallest sequence number out of the plurality of packets stored in the packet reception buffer is greater than the stored sequence number stored in the sequence number storage unit of the receiver, the receiver leaves the actual first arrival packet in the packet reception buffer, and
   wherein if the sequence number of the actual first arrival packet among the plurality of packets each having the smallest sequence number out of the plurality of packets stored in the packet reception buffer is smaller than the stored sequence number stored in the sequence number storage unit of the receiver and a timer of the receiver is not activated, the receiver activates the timer,
   or if the actual first arrival packet is output and the timer is activated, the receiver stops the timer,
   or if a timeout is generated from the timer, the receiver increments the stored sequence number and stops the timer,
   or if the timer is not activated or if the timer is activated but the timeout is not generated from the timer, the receiver performs a processing for comparing the stored sequence number stored in the sequence number storage unit of the receiver with the sequence number of the actual first arrival packet among the plurality of packets each having the smallest packet number out of the plurality of packets stored in the packet reception buffer.

6. A packet transmission system comprising:
a transmitter; and
a receiver,
wherein the transmitter includes a transmitting unit for transmitting a packet to the receiver via a plurality of transmission paths, and the receiver includes a selecting unit for selecting an actual first arrival packet from among packets received via the plurality of transmission paths, respectively by searching sequence numbers of actually received packets, wherein a plurality of packet devices each including the transmitter and the receiver is mutually connected in a network, and wherein the transmitter of one of the packet devices, that is a source packet device from which the packet is transmitted, includes an assigning unit for assigning a sequence number stored in a sequence number storage unit to the packet, wherein the sequence number corresponds to one of the packet devices that is a destination packet device to which the packet is transmitted.

7. The packet transmission method according to claim 6, wherein the receiver of one of the packet devices that is a destination packet device, to which the packet is transmitted, includes sorting unit for sorting the actually received packets to a plurality of packet selectors, respectively, based on packet device identification information included in the actually received packets, each of the packet selectors selecting the actual first arrival packet.

8. The packet transmission system according to claim 6, wherein the receiver includes outputting unit for outputting the actual first arrival packet and incrementing the stored sequence number, and for abandoning the packets having smaller sequence numbers than the stored sequence number stored in the sequence number storage unit out of the plurality of packets stored in the packet reception buffer, if a stored sequence number stored in a sequence number storage unit of the receiver coincides with the sequence number of the actual first arrival packet among a plurality of packets each having a smallest sequence number out of a plurality of packets stored in a packet reception buffer.

9. The packet transmission system according to claim 8, wherein the receiver includes a leaving unit, if the sequence number of the actual first arrival packet among the plurality of packets each having the smallest sequence number out of the plurality of packets stored in the packet reception buffer is greater than the stored sequence number stored in the sequence number storage unit of the receiver, for leaving the actual first arrival packet in the packet reception buffer.

10. A packet transmission system comprising:
a transmitter; and
a receiver, wherein the transmitter includes a transmitting unit for transmitting a packet to the receiver via a plurality of transmission paths, and the receiver includes a selecting unit for selecting an actual first arrival packet from among packets received via the plurality of transmission paths, respectively by searching sequence numbers of actually received packets, wherein the receiver includes an outputting unit for, if a stored sequence number stored in a sequence number storage unit of the receiver coincides with the sequence number of the actual first arrival packet among a plurality of packets each having a smallest sequence number out of a plurality of packets stored in a packet reception buffer, outputting the actual first arrival packet and incrementing the stored sequence number, and for abandoning the packets having smaller sequence numbers than the stored sequence number stored in the sequence number storage unit out of the plurality of packets stored in the packet reception buffer, wherein the receiver includes an leaving unit, if the sequence number of the actual first arrival packet among the plurality of packets each having the smallest sequence number out of the plurality of packets stored in the packet reception buffer is greater than the stored sequence number stored in the sequence number storage unit of the receiver, for leaving the actual first arrival packet in the packet reception buffer, wherein the receiver includes an activating unit configured for activating a timer if the sequence number of the actual first arrival packet among the plurality of packets each having the smallest sequence number out of the plurality of packets stored in the packet reception buffer is smaller than the stored sequence number stored in the sequence number storage unit of the receiver and the timer of the receiver is not activated, a stopping unit configured for stopping the timer if the actual first arrival packet is output and the timer is activated, an incrementing unit, if a timeout is generated from the timer, for incrementing the stored sequence number and stopping the timer, and a comparing unit configured for performing a processing for comparing the stored sequence number stored in the sequence number storage unit of the receiver with the sequence number of the actual first arrival packet among the plurality of packets each having the smallest packet number out of the plurality of packets stored in the packet reception buffer if the timer is not activated or if the timer is activated but the timeout is not generated from the timer.

11. A packet transmission system comprising:
a transmitter;
and a receiver, wherein the transmitter transmits a packet to the receiver via a plurality of transmission paths, and the receiver selects an actual first arrival packet from among the packet received via the plurality of transmission paths, respectively by searching sequence number of actually received packets, wherein the plurality of packet devices each including the transmitter and the receiver are mutually connected in a network, and wherein the transmitter of one of the packet devices, that is a source packet device from which the packet is transmitted, assigns a sequence number stored in a sequence number storage unit to the packet, wherein the sequence number corresponds to one of the packet devices that is a destination packet device to which the packet is to be transmitted.

* * * * *